United States Patent
Choi

(10) Patent No.: US 8,098,487 B2
(45) Date of Patent: Jan. 17, 2012

(54) DISPLAY APPARATUS

(75) Inventor: Man Yong Choi, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/954,289

(22) Filed: Nov. 24, 2010

(65) Prior Publication Data

US 2011/0069005 A1    Mar. 24, 2011

Related U.S. Application Data

(63) Continuation of application No. 12/796,395, filed on Jun. 8, 2010, now Pat. No. 7,929,280, which is a continuation of application No. 12/031,129, filed on Feb. 14, 2008, now Pat. No. 7,760,491.

(30) Foreign Application Priority Data

Jun. 4, 2007  (KR) .................. 10-2007-0054205

(51) Int. Cl.
*G06F 1/16* (2006.01)
(52) U.S. Cl. ................................. 361/679.21
(58) Field of Classification Search ............. 361/679.22; 349/58; 345/156
See application file for complete search history.

(56) References Cited

U.S. PATENT DOCUMENTS

| | | | |
|---|---|---|---|
| 5,146,354 A | 9/1992 | Plesinger | 359/49 |
| 5,164,542 A | 11/1992 | Hart | 174/383 |
| 5,335,100 A | 8/1994 | Obata | 359/49 |
| 5,422,751 A | 6/1995 | Lewis | 359/83 |
| 5,524,908 A | 6/1996 | Reis | 277/233 |
| 5,579,595 A | 12/1996 | Dutton | 38/102.1 |
| 5,841,227 A | 11/1998 | Terpin | 313/479 |
| 6,008,870 A | 12/1999 | Yun | 349/58 |
| 6,144,552 A * | 11/2000 | Whitcher et al. | 361/679.3 |
| 6,181,390 B1 * | 1/2001 | Wang et al. | 349/58 |
| 6,330,045 B1 | 12/2001 | Tanaka | 349/58 |
| 6,381,124 B1 * | 4/2002 | Whitcher et al. | 361/679.3 |
| 6,462,939 B1 | 10/2002 | Heirich | |
| 6,477,039 B2 | 11/2002 | Tajima | 361/679.21 |
| 6,522,371 B1 | 2/2003 | Sakamoto et al. | 349/58 |
| 6,532,152 B1 | 3/2003 | White et al. | 361/692 |
| 6,560,124 B1 | 5/2003 | Irie et al. | 361/679.21 |
| 6,578,972 B1 | 6/2003 | Heirich et al. | 359/608 |
| 6,707,478 B2 | 3/2004 | Kim | 345/156 |
| 6,801,195 B2 * | 10/2004 | Yoshida | 345/204 |

(Continued)

FOREIGN PATENT DOCUMENTS

CN    1579091    2/2005

(Continued)

OTHER PUBLICATIONS

Notification of Transmittal of the International Search Report and the Written Opinion of the International Searching Authority, or the Declaration, dated Mar. 28, 2008.

(Continued)

*Primary Examiner* — Lisa Lea-Edmonds
(74) *Attorney, Agent, or Firm* — KED & Associates, LLP

(57) ABSTRACT

A display apparatus is provided. A frame is fixed and supported at the rear of a front panel forming the front portion of the display apparatus, and a separate bracket member is not mounted on the edges of the front panel. Thus, the front exterior of the display apparatus is neatly finished, and the display screen looks bigger than it actually is.

28 Claims, 17 Drawing Sheets

U.S. PATENT DOCUMENTS

| | | | | |
|---|---|---|---|---|
| 6,802,717 | B2 | 10/2004 | Castro | 434/169 |
| 6,809,713 | B2 | 10/2004 | Peng | 345/87 |
| 6,813,159 | B2 | 11/2004 | Irie et al. | 361/679.24 |
| 6,819,550 | B2 | 11/2004 | Jobs et al. | 361/683 |
| 6,848,793 | B2 | 2/2005 | Utsumi | |
| 6,891,582 | B2 | 5/2005 | Hwang | 349/58 |
| 6,930,734 | B2 | 8/2005 | Lee | 361/679.21 |
| 6,937,297 | B2 * | 8/2005 | Kang et al. | 349/58 |
| D532,011 | S | 11/2006 | Andre et al. | D14/375 |
| 7,206,038 | B2 | 4/2007 | Choi et al. | 349/58 |
| 7,251,140 | B2 | 7/2007 | Bae et al. | 361/719 |
| 7,304,250 | B2 | 12/2007 | Arakawa et al. | 174/381 |
| 7,319,499 | B2 | 1/2008 | Peng | 361/679.27 |
| 7,327,407 | B2 | 2/2008 | Huber | 348/789 |
| 7,348,964 | B1 | 3/2008 | Gettemy et al. | 345/173 |
| 7,423,878 | B2 | 9/2008 | Kim | 361/704 |
| 7,433,178 | B2 | 10/2008 | Bang et al. | 361/679.21 |
| 7,450,112 | B2 | 11/2008 | Shneidman | 345/173 |
| 7,466,540 | B2 | 12/2008 | Takahashi et al. | 361/679.27 |
| 7,495,894 | B2 | 2/2009 | Yu et al. | 361/681 |
| 7,508,654 | B2 * | 3/2009 | Lee et al. | 361/679.21 |
| 7,561,422 | B2 | 7/2009 | Meng et al. | 361/681 |
| 7,626,808 | B2 | 12/2009 | Tai et al. | |
| 7,626,809 | B2 | 12/2009 | Tai et al. | 361/679.21 |
| 7,663,870 | B2 * | 2/2010 | Choi | 361/679.22 |
| 7,697,272 | B2 * | 4/2010 | Choi | 361/679.21 |
| 7,760,491 | B2 * | 7/2010 | Choi | 361/679.01 |
| 7,764,332 | B2 | 7/2010 | Zhang | |
| 7,889,484 | B2 * | 2/2011 | Choi | 361/679.21 |
| 7,929,280 | B2 * | 4/2011 | Choi | 361/679.02 |
| 7,929,287 | B2 * | 4/2011 | Yukawa et al. | 361/679.23 |
| 2002/0067591 | A1 | 6/2002 | Tajima | 361/681 |
| 2003/0184958 | A1 | 10/2003 | Kao | |
| 2004/0027498 | A1 | 2/2004 | Huber | |
| 2004/0156168 | A1 | 8/2004 | LeVasseur et al. | 361/681 |
| 2004/0239619 | A1 | 12/2004 | Takahashi et al. | |
| 2005/0083646 | A1 | 4/2005 | Bae et al. | |
| 2005/0093429 | A1 | 5/2005 | Ahn et al. | 313/498 |
| 2005/0117283 | A1 | 6/2005 | Lee et al. | 361/681 |
| 2005/0174726 | A1 | 8/2005 | Bang et al. | 361/681 |
| 2005/0212982 | A1 | 9/2005 | Soga | 348/825 |
| 2005/0270734 | A1 | 12/2005 | Lam et al. | 361/681 |
| 2006/0012962 | A1 | 1/2006 | Obata | 361/704 |
| 2006/0040520 | A1 | 2/2006 | Moh | 439/66 |
| 2006/0043854 | A1 | 3/2006 | Kim | 313/36 |
| 2006/0044746 | A1 * | 3/2006 | Kim et al. | 361/681 |
| 2006/0077620 | A1 | 4/2006 | Kim | 361/681 |
| 2006/0077629 | A1 | 4/2006 | Shiraishi | 361/681 |
| 2006/0133017 | A1 * | 6/2006 | Bang | 361/681 |
| 2006/0192753 | A1 * | 8/2006 | Fukuhara | 345/156 |
| 2006/0209502 | A1 | 9/2006 | Sakata et al. | 361/681 |
| 2006/0237599 | A1 | 10/2006 | Ternus et al. | 248/176.1 |
| 2007/0040891 | A1 | 2/2007 | Calloway | 348/14.01 |
| 2007/0076138 | A1 | 4/2007 | Chiu et al. | 349/58 |
| 2007/0103854 | A1 | 5/2007 | Yu et al. | 361/681 |
| 2007/0127198 | A1 | 6/2007 | Cho | 361/681 |
| 2007/0200963 | A1 | 8/2007 | Shin | |
| 2007/0211191 | A1 | 9/2007 | Cho et al. | 349/58 |
| 2008/0165480 | A1 | 7/2008 | Tai et al. | |
| 2008/0186662 | A1 * | 8/2008 | Lee | 361/681 |
| 2008/0218952 | A1 | 9/2008 | Benn | |
| 2008/0297998 | A1 | 12/2008 | Choi | 361/681 |
| 2008/0297999 | A1 | 12/2008 | Choi | 361/681 |
| 2008/0298000 | A1 | 12/2008 | Choi | 361/681 |
| 2008/0298001 | A1 | 12/2008 | Choi | 361/681 |
| 2009/0086123 | A1 | 4/2009 | Tsuji et al. | |
| 2009/0225507 | A1 | 9/2009 | Sato | 361/679.21 |
| 2009/0279240 | A1 | 11/2009 | Karppanen | 361/679.21 |
| 2010/0046193 | A1 * | 2/2010 | Choi | 361/818 |
| 2010/0118479 | A1 * | 5/2010 | Choi | 361/679.01 |
| 2011/0037719 | A1 * | 2/2011 | Choi | 345/173 |

FOREIGN PATENT DOCUMENTS

| | | |
|---|---|---|
| JP | 2001-125072 | 5/2001 |
| JP | 2004-059822 | 3/2004 |
| JP | 2004-302117 | 10/2004 |
| JP | 2004-361664 | 12/2004 |
| JP | 2005-070662 | 3/2005 |
| JP | 2005-079865 | 3/2005 |
| JP | 2006-010967 | 1/2006 |
| JP | 2006-235425 | 9/2006 |
| JP | 2007-017513 | 1/2007 |
| JP | 2007-114807 | 5/2007 |
| KR | 2005-0029780 | 3/2005 |
| KR | 1020050034186 | 4/2005 |
| KR | 1020060008751 | 1/2006 |
| KR | 10-2006-0017232 | 2/2006 |
| KR | 2006-0017232 | 2/2006 |
| KR | 1020060021076 | 3/2006 |
| KR | 10-2006-0059536 | 6/2006 |
| KR | 2006-0098882 | 9/2006 |
| WO | WO 2005/112439 | 11/2005 |
| WO | WO 2010047450 A1 * | 4/2010 |

OTHER PUBLICATIONS

Written Opinion of the International Searching Authority, dated Mar. 28, 2008.

International Search Report.

International Search Report dated Aug. 27, 2008.

Notification of Transmittal of the International Search Report and the Written Opinion of the International Searching Authority, or the Declaration dated Aug. 27, 2008.

Written Opinion of the International Searching Authority dated Aug. 27, 2008.

Office Action dated Jan. 19, 2010 for U.S. Appl. No. 12/031,203.

Office Action dated Jan. 19, 2010 for copending U.S. Appl. No. 12/031,203.

Office Action dated Mar. 30, 2010 for copending U.S. Appl. No. 12/609,279.

Notice of Allowance dated Sep. 25, 2009 for U.S. Appl. No. 12/031,178.

European Search Report dated Jun. 8, 2010.

European Search Report dated Jun. 8, 2010 for U.S. Appl. No. 07851534.3.

European Search Report dated Jun. 11, 2010 for U.S. Appl. No. 07851532.7.

Notice of Allowance dated Jul. 20, 2010 for U.S. Appl. No. 12/031,203.

Final Office Action dated Sep. 2, 2010 for U.S. Appl. No. 12/609,279.

Office Action dated Sep. 13, 2010 for U.S. Appl. No. 12/692,386.

Notice of Allowance dated Oct. 14, 2010 for U.S. Appl. No. 12/796,395.

LG KG800 "Chocolate" GSM/GPRS 900/1800/1900Mhz Cellular Phone, Report #11816-060725-BTf, pp. 1-137; Portelligent, www.teardown.com, 2006.

Apple iMac computer: 1998 Original iMac 15", 2002 iMac 20", 2005 iMac 20" and 2007 iMac 20". Inside look of the Apple iMac at link: http://www.ifixit.com/Teardown/iMac-20-Inch/658/1.

U.S. Office Action dated Jun. 6, 2011 for U.S. Appl. No. 12/031,233.

U.S. Office Action dated Jun. 13, 2011 for U.S. Appl. No. 12/692,386.

U.S. Office Action dated Jun. 23, 2011 for U.S. Appl. No. 12/609,279.

Korean Office Action for Application 10-2007-0054205 dated Jan. 5, 2011.

Chinese Office Action for Application 200780053223.2 dated Feb. 1, 2011.

* cited by examiner

US 8,098,487 B2

DISPLAY APPARATUS

CROSS-REFERENCE TO RELATED APPLICATIONS

This application is a Continuation Application of U.S. application Ser. No. 12/796,395, filed Jun. 8, 2010 now U.S. Pat. No. 7,929,280, which is a Continuation Application of U.S. application Ser. No. 12/031,129 filed Feb. 14, 2008 (now U.S. Pat. No. 7,760,491), which claims priority from Korean Application No. 10-2007-0054205, filed Jun. 4, 2007, the subject matters of which are incorporated herein by reference.

BACKGROUND

The present disclosure relates to a display apparatus.

The appearance of display apparatuses such as liquid crystal displays (LCD) and plasma display panels (PDP) with high-definition and large-sized screens is a relatively recent phenomenon.

These display apparatuses have front covers covering the front perimeters thereof.

Specifically, a front panel made of a transparent material for transmitting images while protecting the display module is installed on the front surface of a display module. A front cover is fixed and coupled to the perimeter of the front panel. The front cover thus functions to support the front panel.

Because the periphery of the front panel must be supported by the front cover, a portion of the front panel is necessarily covered by the front cover.

Because a portion of the perimeter of the front panel is blocked by the front cover, a limitation arises in which the display screen appears smaller from the outside.

Additionally, because a separate front cover is needed to support the front panel, the overall manufacturing cost of the display apparatus increases, and assembly becomes more complicated.

SUMMARY

Embodiments provide a display apparatus with a front exterior that is neatly finished, while the display screen appears larger from the outside than it actually is.

Embodiments also provide a display apparatus having front panel at the front thereof that is securely supported by the frame, so that even when product dimensions are increased, the front panel will not warp or slip downward.

Embodiments further provide a display apparatus with a configuration that does not require a separate covering member to enclose the frontal perimeter of the display apparatus, so that the assembling process of the product is simplified, and manufacturing costs can be reduced.

In one embodiment, a display apparatus includes: a front panel defining a front portion thereof; a plurality of frames fixed at a rear surface of the front panel, to support the front panel; a display module fixed to the frames, to output an image; and a rear housing receiving the display module and disposed at a rear of the front panel, to expose an edge of the front panel.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
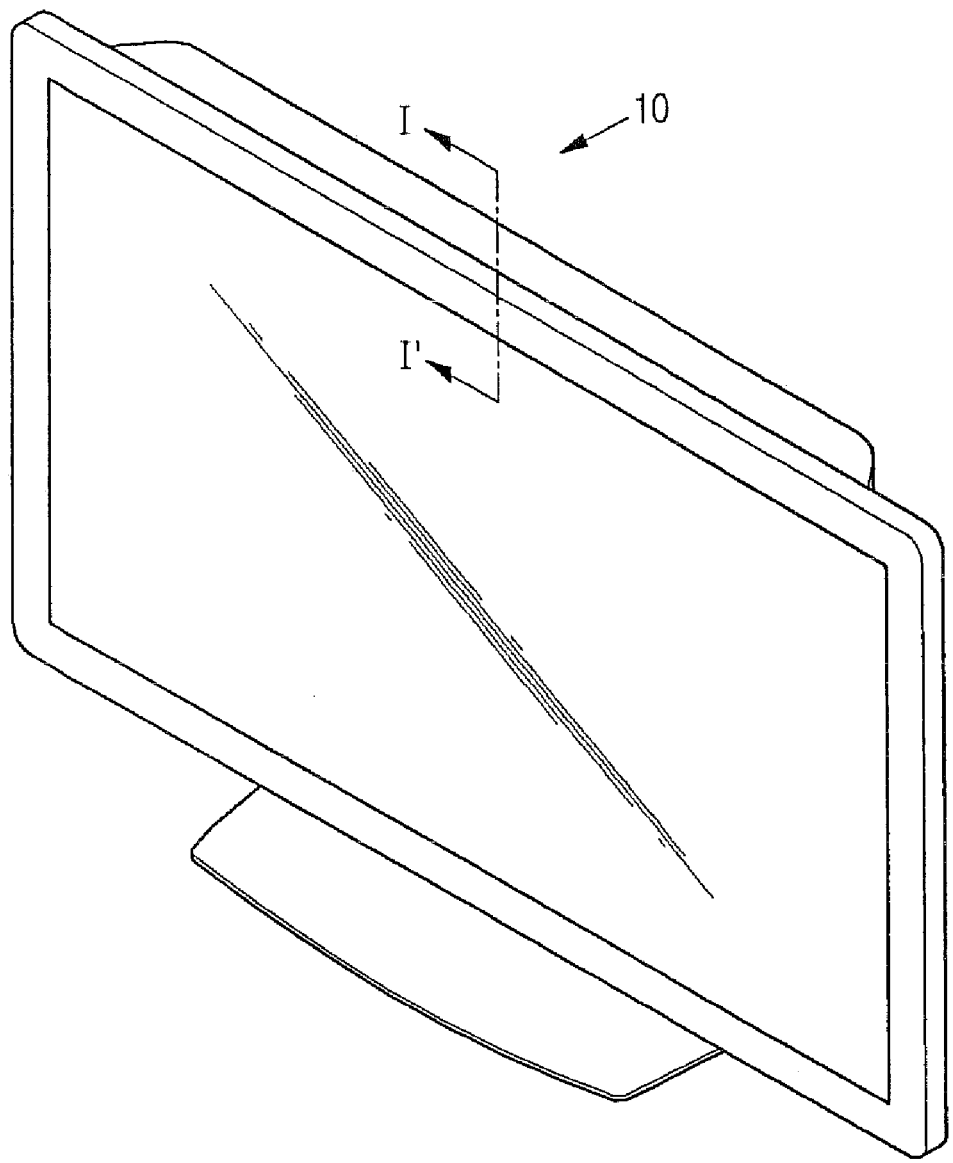
FIG. 1 is a perspective view of a display apparatus according to an embodiment of the present disclosure.
Figure 2:
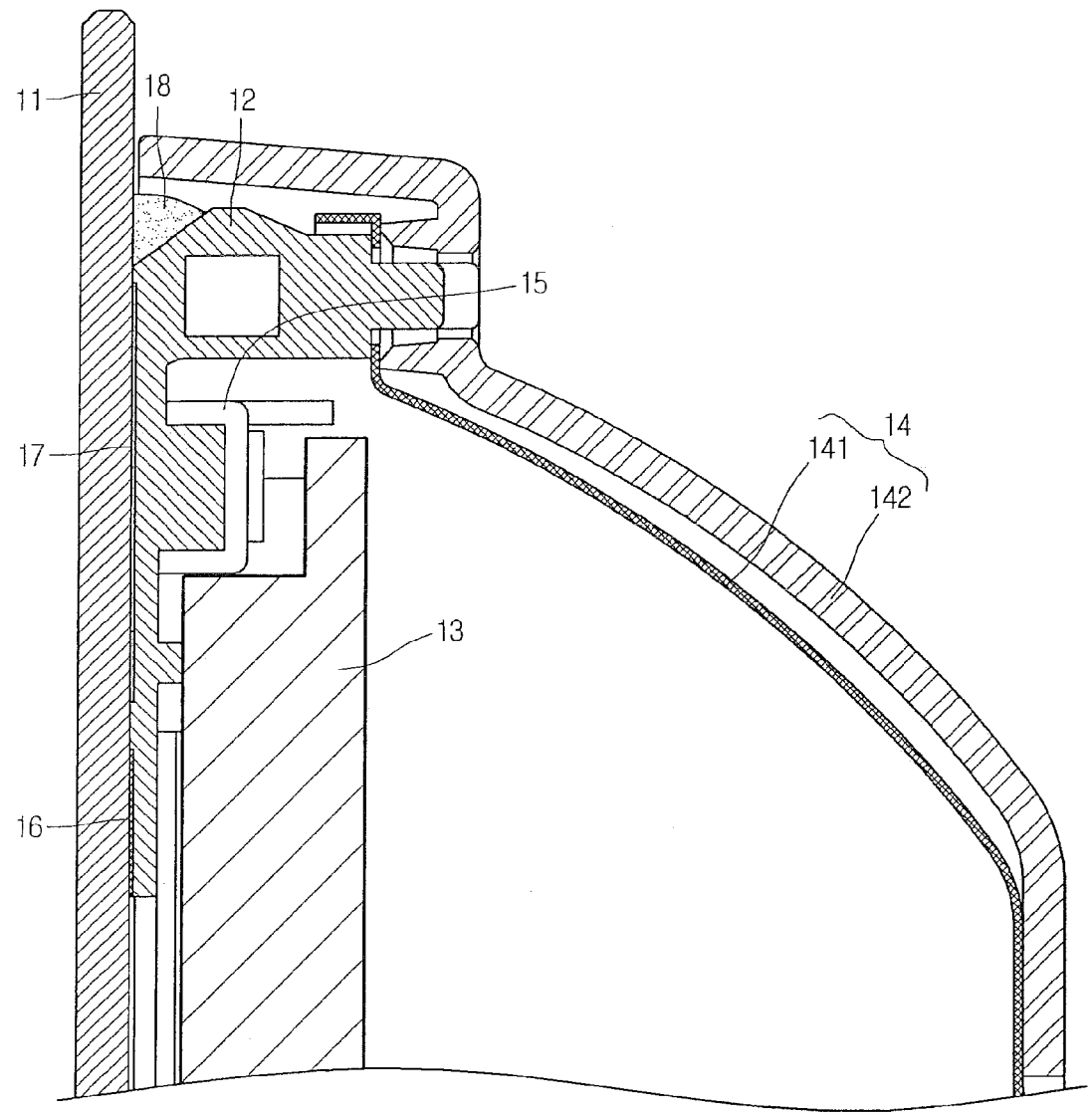
FIG. 2 is a sectional view of FIG. 2 taken along line I-I'.
Figure 3:
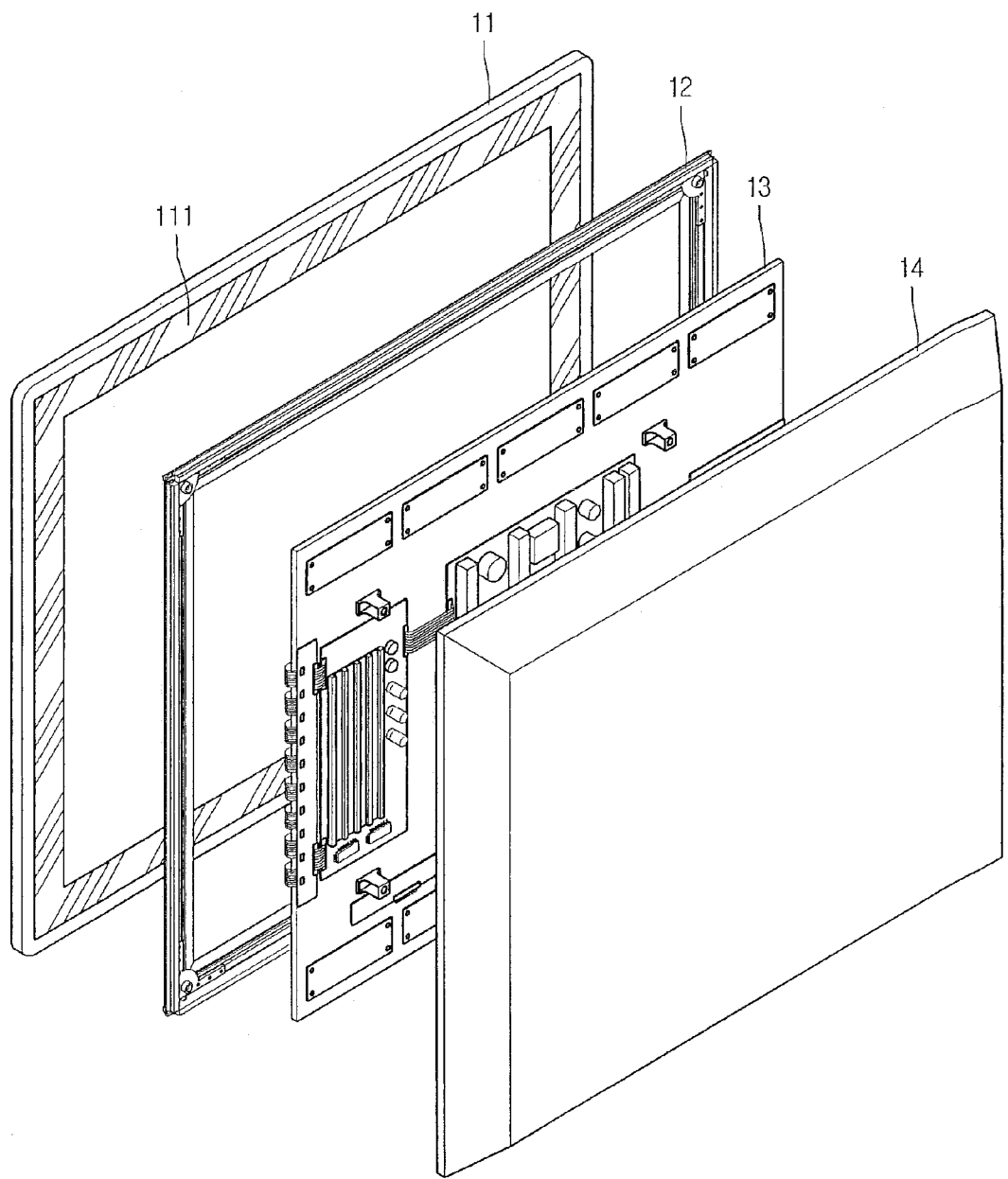
FIG. 3 is an exploded perspective view of a display apparatus according to an embodiment of the present disclosure.

FIG. 1 is a perspective view of a display apparatus according to an embodiment of the present disclosure, FIG. 2 is a sectional view of FIG. 2 taken along line I-I', and FIG. 3 is an exploded perspective view of a display apparatus according to an embodiment of the present disclosure.

Referring to FIGS. 1 to 3, a display apparatus 10 according to an embodiment of the present disclosure includes a display module 13 outputting an image, a front panel 11 protecting the front surface of the display module 13, a frame 12 coupled tightly to the front panel 11 and having the display module 13 fixed to the rear thereof, a bracket 15 connecting the frame 12 and the display module 13, and a rear housing 14 coupled at the rear of the front panel 11 and enclosing and protecting the display module 13.

In detail, an adhering member 17 is interposed between the front panel 11 and frame 12 to fix the frame 12 to the front panel 11. Also, a gasket 16 for blocking electromagnetic interference (EMI) is interposed between the front panel 11 and the frame 12. The adhering member 17 and the gasket 16 are respectively disposed at a predetermined distance.

An opaque film layer 111 is formed along the rear perimeter of the front panel 11. Specifically, the film layer 111 may be provided in a variety of ways, and may be coated on the front panel in one embodiment. The frame 12 is mounted along the film layer 111, so that the frame 12 is not visible from the front of the display apparatus 10.

The front panel 11 may be formed of a transparent material enabling an image provided through the display module 13 to be viewed. In order to satisfy strength requirements for larger sizes, the front panel may be made of tempered glass. However, the material for the front panel 11 is not restricted to any embodiment, and may one of various materials including transparent plastic. That is, any material that is transparent and satisfies predetermined strength specifications may be used within the scope of the present disclosure.

A sealing member 18 is applied to a frontal upper portion of the frame 12 to prevent impurities from entering through a gap between the frame 12 and front panel 11. The frame 12 surrounds the rear perimeter of the front panel 11. Specifically, a plurality of frames 12 is mounted at positions separated a predetermined distance from the edges of the front panel 11. When the end portions of adjacent frames 12 are pressed together and connected, the bracket 15 is mounted on the connected portions.

A front perimeter portion is pressed against the frame at the rear housing 14 that covers and protects the display module 13, and includes an inner housing 141 formed of a conductive material, and an outer housing 142 covering the inner housing 141. However, the rear housing 14 does not have to include the two components, and may include only one conductive cover.

Here, electromagnetic interference (EMI) emitted from the display module 13 flows through an EMI grounding gasket, 16 attached to the front of the frame 12, and the frame 12. The EMI flowing along the frame 12 is transferred to the rear housing 14. Therefore, it is preferable that the frame 12 is made of a conductive material, and may be made of an aluminum material according to one embodiment. However the material for the frame 12 does not have to be limited to an aluminum material, and may be made of any material through which electric current can flow.

Here, the frame 12 may be manufactured of a non-conductive material, such as a plastic injection molded material. In this case, a separate EMI grounding structure for grounding EMI is required, which will be described below with reference to the diagrams.

Figure 4:
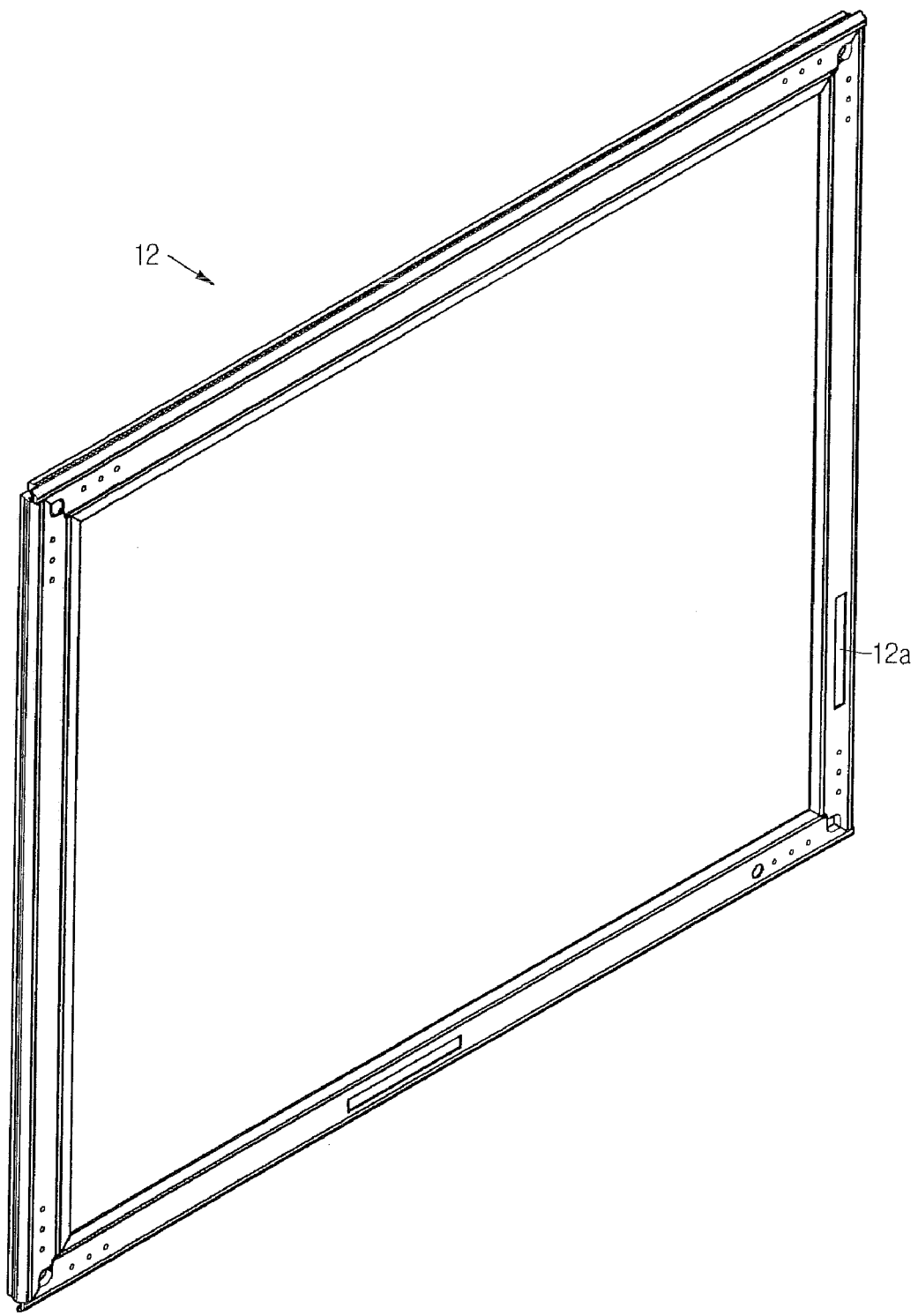
FIG. 4 is a frontal perspective view of a frame for a display apparatus according to an embodiment of the present disclosure.
Figure 5:
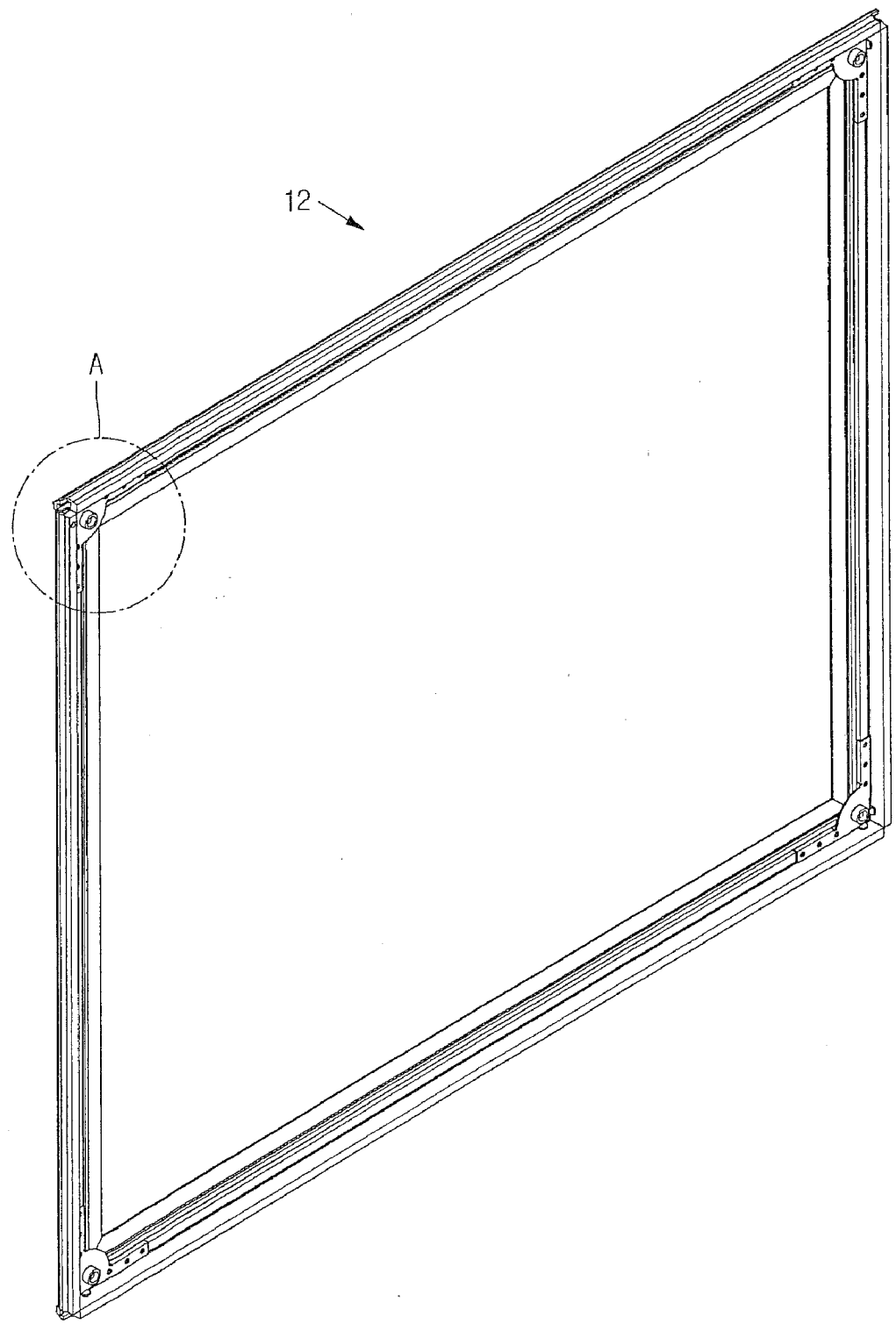
FIG. 5 is a rear perspective view of a frame for a display apparatus according to an embodiment of the present disclosure.

FIG. 4 is a frontal perspective view of a frame for a display apparatus according to an embodiment of the present disclosure, and FIG. 5 is a rear perspective view of a frame for a display apparatus according to an embodiment of the present disclosure.

Referring to FIGS. 4 and 5, a plurality of frames 12 of a display apparatus 10 according to an embodiment of the present disclosure are tightly fixed against a front panel 11.

That is, the frames 12 are pressed against other frames 12 at the ends thereof, and portions pressed against each other are connected through brackets 15.

A portion of the frames 12 have a hole 12a of a predetermined size defined therein, and a control panel for controlling the display apparatus is mounted in the hole 12a.

In more detail, a front panel 11 made of tempered glass is mounted to the front of the frame 12, and a touch-screen type control panel is coupled behind the frame 12. Thus, a user may turn power on/off or switch channels and control volume by touching the surface of the front panel 11 where the control panel is inserted.

The frame 12 is formed of straightly formed metal or plastic material with a predetermined degree of strength. This is to prevent warping of the front panel 11 when the dimensions of the display apparatus 10 are increased.

Below, a detailed description of the connecting parts of the frame 12 will be given with reference to the diagrams.

Figure 6:
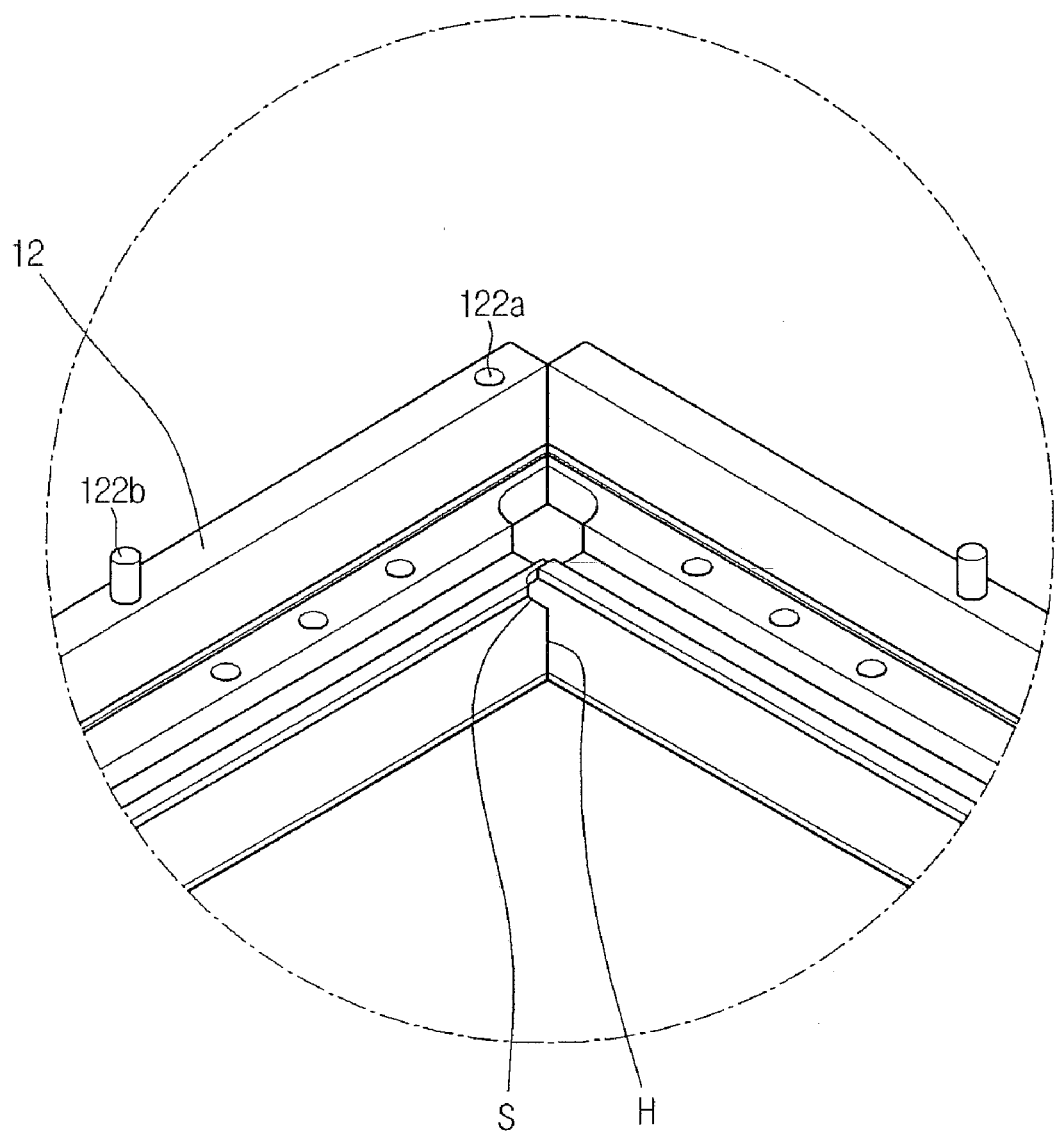
FIG. 6 is an enlarged perspective view of region A in FIG. 5.
Figure 7:
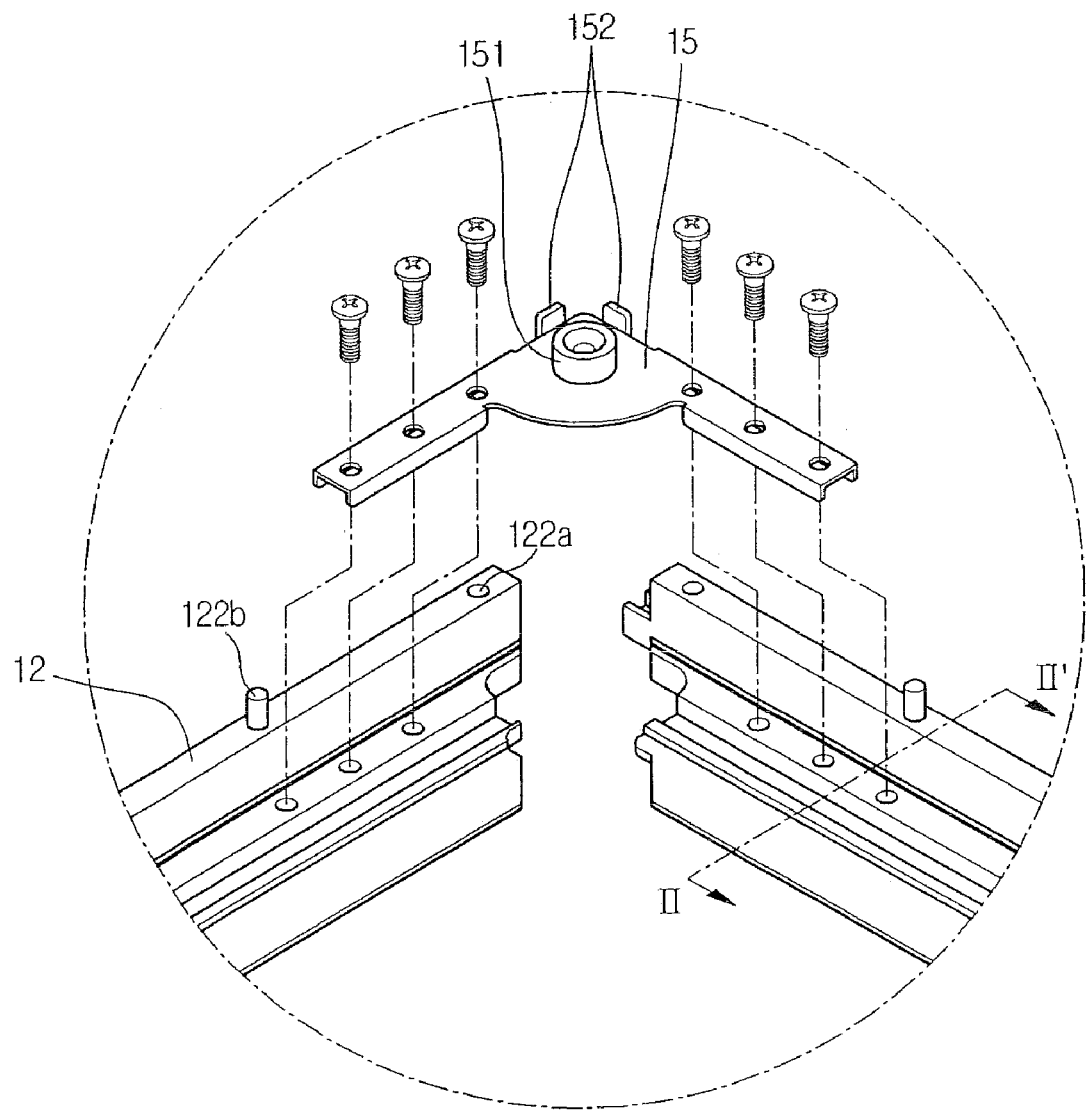
FIG. 7 is an exploded perspective view of region A in FIG. 5.

FIG. 6 is an enlarged perspective view of region A in FIG. 5, and FIG. 7 is an exploded perspective view of region A in FIG. 5.

Referring to FIGS. 6 and 7, the frames 12 mounted at the rear surface of the front panel 11 are connected together in plurality through a bracket 15.

That is, the bracket 15 is bent in an "L" shape to be seated at the joining portions at the ends of the frames 12. Also, a protruding portion, namely, a bracket mounting portion 123 (in FIG. 8) is formed on the frame 12 in order to mount the bracket 15. A plurality of fastening members are passed through the bracket 15 and inserted into the frame 12.

A boss 151 of a predetermined height is protrudingly formed at the center of the bracket 15. An edge portion of the display module 13 (that is, a module lug 131 in FIG. 10) is mounted on the boss 151. Accordingly, the display module 13 and the frame 12 are connected with a gap equal to the length of the boss 151.

An anti-movement rib 152 protrudes at the corner of the bracket 15 to ensure that the display module 13 remains coupled in a proper position. In other words, when the display module 13 is mounted at the rear of the frame 12, it is guided to remain in its proper position. Therefore, the fastening hole defined in the module lug 132 is precisely positioned. Also, a screw or other fastening member is passed through the fastening hole and inserted into the boss, to fix the display module 13 to the frame 12.

The ends of the frames 12 are connected to each other at right angles. Thus, each end of the frames 12 are tapered at 45° with respect to the lengths of the frames.

If the ends of the frames 12 are not formed with a 45° taper, when two frames 12 are coupled, the surfaces pressed together may slip and be displaced. To prevent the latter from occurring, the ends of the frames 12 may be formed in a shape that is not straight. In other words, the ends of the frames 12 form a straight portion S and a stepped portion H that is stepped at a certain point of the straight portion S. Further, the stepped portion H may be provided singularly or in plurality. Here, the stepped portion H is bent from an extending direction of the straight portion S in another direction (or deviating direction).

As shown, by forming the stepped portion H at a point of the straight portion S, even when force is applied to one of two joined frames 12 in its lengthwise direction, the stepped portion H prevents the joined ends of the frames 12 from being displaced.

The reference number 122a is a fastening hole and 122b is a fixing projection. The fastening hole and the fixing projection are provided in plurality and are alternately provided on the frame 12. They will be explained below more clearly.

Figure 8:
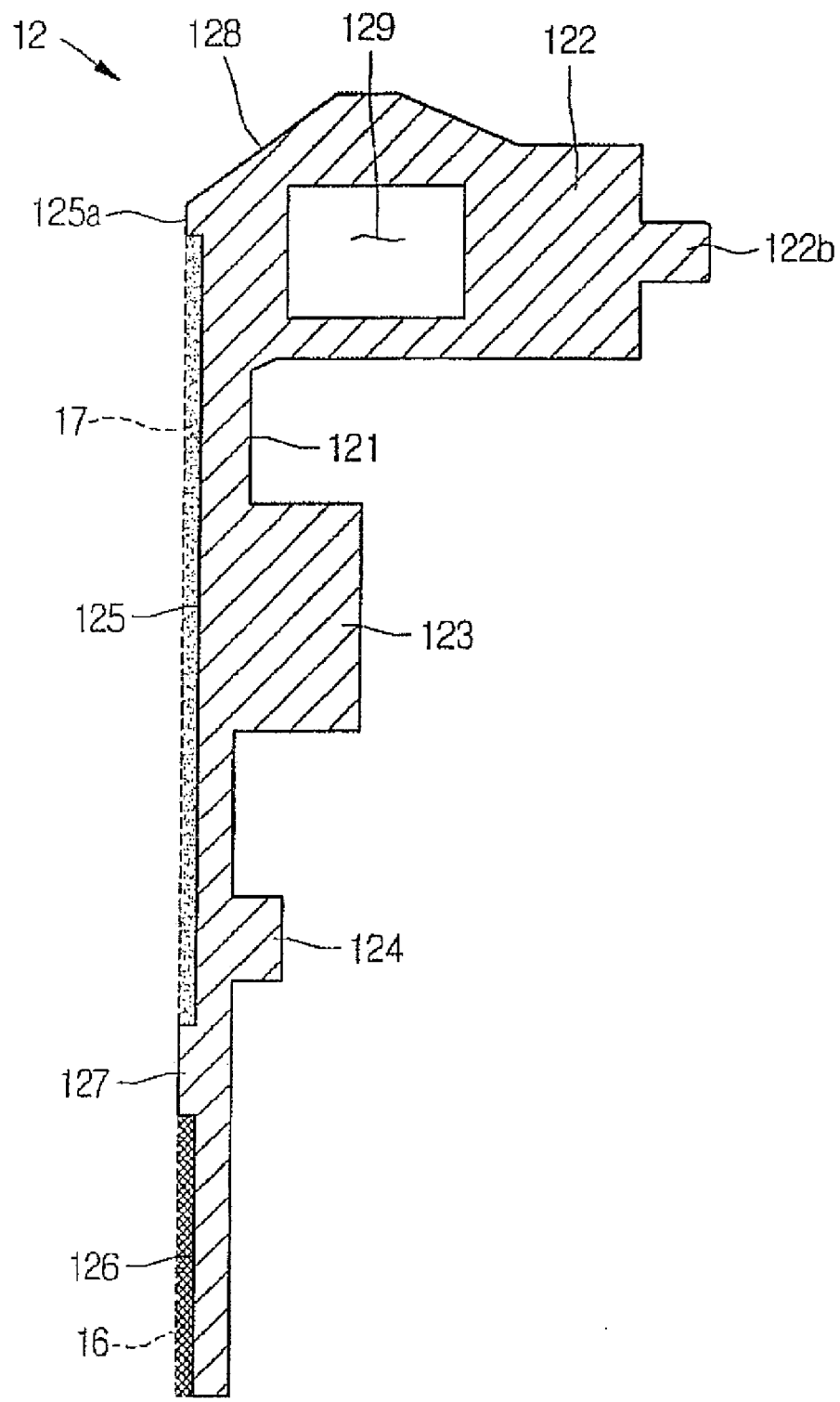
FIG. 8 is a sectional view of FIG. 7 taken along line II-II'.

FIG. 8 is a sectional view of FIG. 7 taken along line II-II'.

Referring to FIG. 8, the frames 12 according to an embodiment of the present disclosure are formed of a conductive material, and are pressed against the rear of the front panel 11, to support the front panel 11 and also prevent curving of the front panel 11.

Specifically, the frame 12 includes a body 121 at the rear of the front panel 11, and a head 122 protruding rearward from an upper end of the body 121.

More specifically, an adhering surface 125 on which the adhering member 17 is mounted, and a gasket mounting surface 126 on which a gasket 16 is mounted are formed on the front surface of the frame 12. A dividing rib 127 separating the adhering surface 125 and the gasket mounting surface 126 is further formed. The dividing rib 127 prevents the adhering member 17 and the gasket 16 from sticking to one another.

Here, the adhering surface 125 and the gasket mounting surface 126 may be formed by being recessed a predetermined from the front surface of the body 121. If the adhering surface 125 and the gasket mounting surface 126 share the same surface with the body 121, and are divided by the dividing rib 127, they would be separated by a gap between the front panel 11 and the frame 12 equal to the height of the dividing rib 127. Thus, the dividing rib 127 may be formed on the same surface as the front surface of the body 121, and the adhering surface 125 and the gasket mounting surface 126 may be recessed to form a mutually protruding structure.

The adhering member 17 may be a double-sided tape with a predetermined adhering strength, or may be a liquid adhesive. The gasket 16 may be formed of a conductive material to block EMI.

To hold the sealing member 18 in the front upper end of the head 122, a sealing surface 128 is formed with a slant of a predetermined angle. Thus, when the frame 12 is pressed against and coupled to the rear of the front panel 11, a recessed portion is formed between the sealing surface 128 and the rear surface of the front panel 11, and the sealing member 18 is interposed in the recessed portion. The interposition of the sealing member 18 blocks the formation of gaps between the coupled surfaces of the front panel and the frame 12 and therefore entry of impurities therein.

A cavity 129 is formed within the head 122. That is, the formation of the cavity 129 prevents deformation of the head 122 during the forming of the frame 12 and reduces manufacturing cost.

A bracket mounting portion 123 protrudes at a rear of the body 121 and extends in the lengthwise direction of the frame 12. The bracket 15 is mounted on the bracket mounting portion 123, and the bracket 15 mounted on the bracket mounting portion 123 is bent in a ' ⊏ 'shape. Therefore, the bracket 15 and the bracket mounting portion 123 contact one another on three sides. Due to the shape of the bracket mounting portion 123, the bracket 15 does not move and is securely mounted to the frame 12. Also, the frame 12 is firmly fixed by the bracket 15.

A reinforcing rib 124 protrudes from a predetermined position below the bracket mounting portion 123, and extends in the lengthwise direction of the frame 12. Specifically, the reinforcing rib 124 is formed to reinforce the frame 12. Also, the reinforcing rib 124 allows the frame 12 to retain a straight disposition without bending even when its length is extended.

A leakage preventing rib 125a is protruded from a perimeter of the adhering surface 125, in detail, an upper perimeter of the front portion of the body 121. The leakage preventing rib 125a prevents the adhering member 17 anointed on the adhering surface 125 from leaking or spreading to an outside of the frame 12.

More in detail, if the leakage preventing rib 125a is not provided, the adhering member 17 spreads towards the perimeter of the front panel 11 and is exposed to an outside, and then the exterior of the display doesn't look neat. In order to resolve this kind of problem, the leakage preventing rib 125a is protruded on the frontal perimeter which is located on the edge of the front panel 11.

The rear housing 14 is coupled to the head 122.

In detail, a plurality of fastening holes 122a are arranged at predetermined intervals in the edges of the head 122 and rear housing 14, and fastening members are inserted in the fastening holes 122a to fix the rear housing 14 to the head 122. Also, a plurality of fixing projections 122b may protrude from the head 122, and a plurality of fixing holes may be formed in the edge of the rear housing 14 to insert the fixing projections 122b in. In one exemplary embodiment, a fixing projection 122b may protrude at a point between a fixing hole 122a and another fixing hole 122a. The fixing projection 122b may be inserted into a fixing hole formed in the rear housing 14, so that the fixing hole formed in the rear housing 14 is aligned with the fixing hole 122a formed in the head 123.

Figure 9:
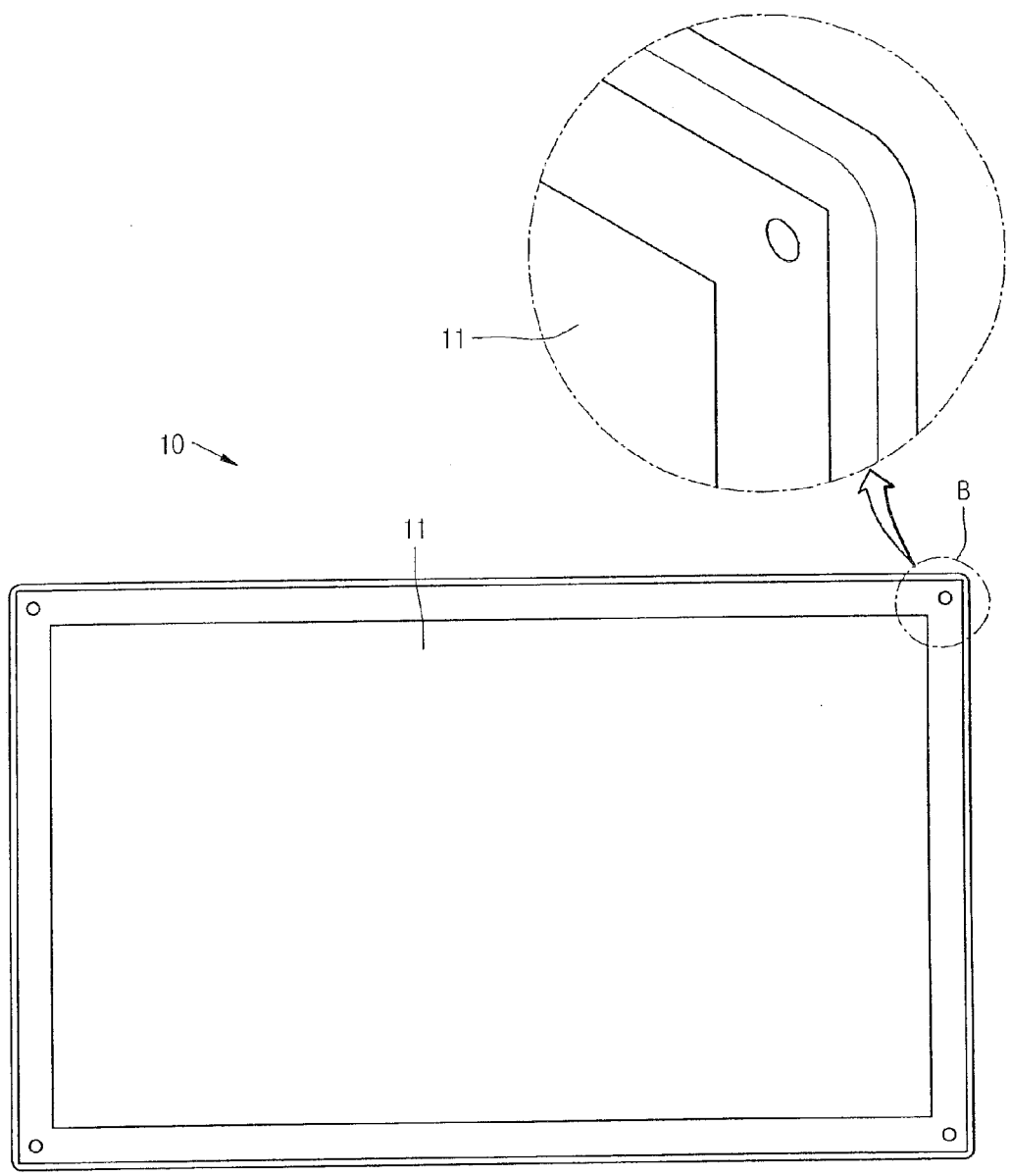
FIG. 9 is a frontal view showing the coupling structure of a front panel according to another embodiment of the present disclosure.
Figure 10:
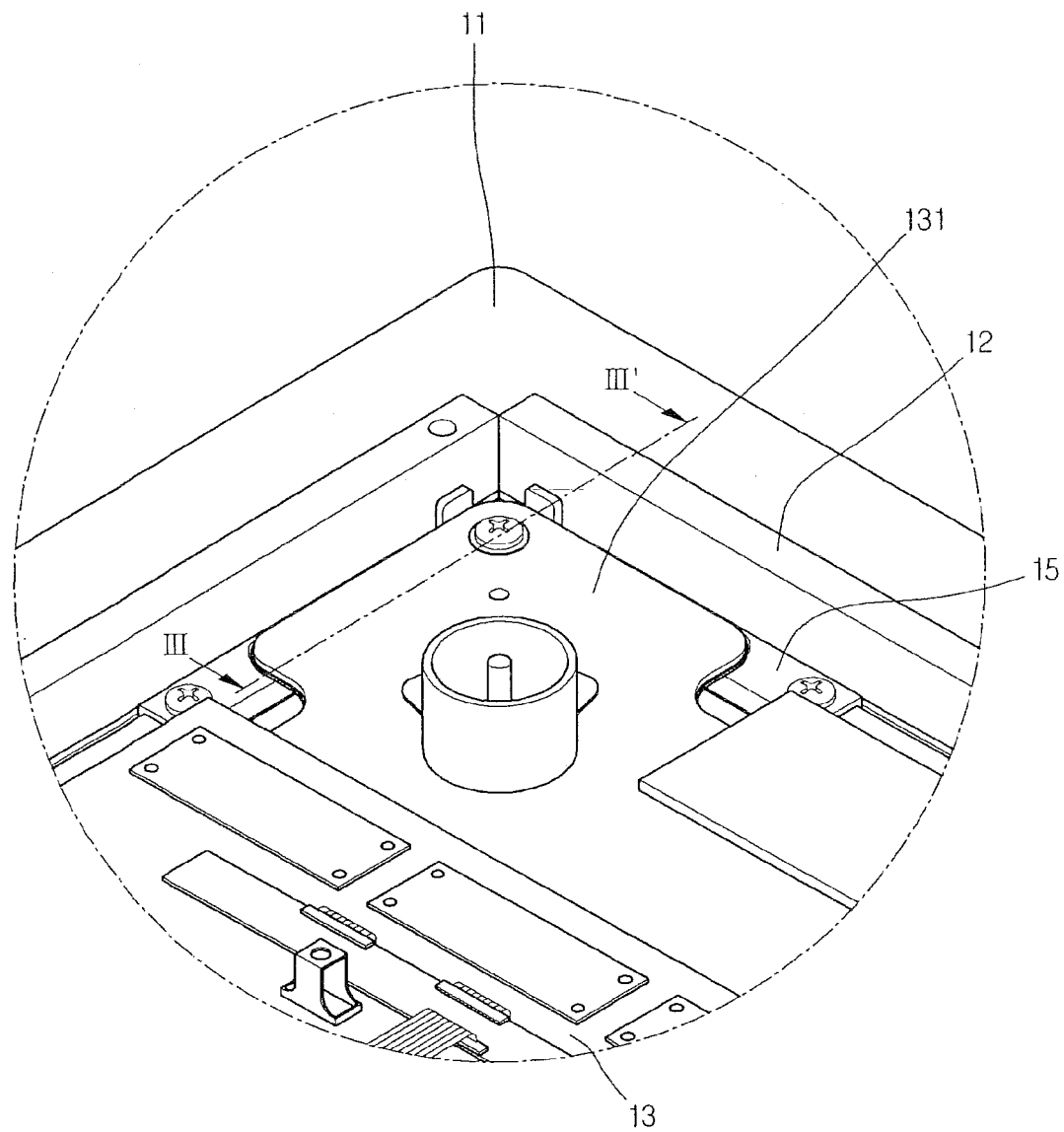
FIG. 10 is a rear perspective view of region B in FIG. 9.
Figure 11:
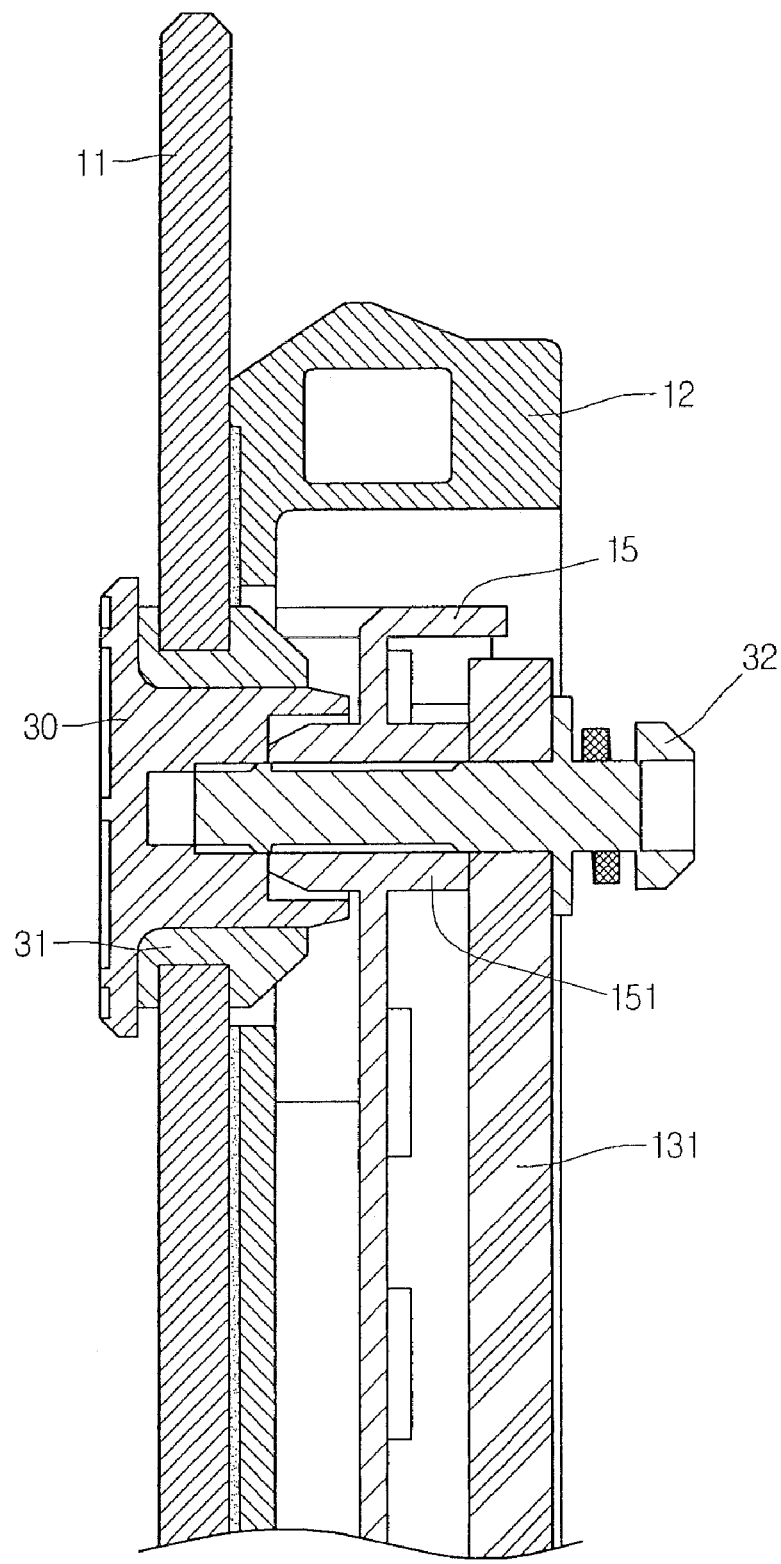
FIG. 11 is a sectional view of FIG. 10 taken along line III-III'.

FIG. 9 is a frontal view showing the coupling structure of a front panel according to another embodiment of the present disclosure, FIG. 10 is a rear perspective view of region B in FIG. 9, and FIG. 11 is a sectional view of FIG. 10 taken along line III-III'.

Referring to FIGS. 9 to 11, according to an embodiment of the present disclosure, the front panel 11 and the display module 13 form a directly coupled structure.

That is, when the front panel 11 and the frame 12 are coupled through the adhering member 17, there is the possibility of the front panel 11 detaching from the frame 12. In other words, when the display apparatus 10 is enlarged, the dimensions of the front panel 11 increase and its weight also increases. When the display apparatus 10 is mounted on a wall, if the weight of the front panel 11 exceeds the adhering strength of the adhering member 17, the front panel 11 can disengage from the frame 12 and fall to the floor.

To obviate this possibility, the present embodiment provides the front panel 11 integrally coupled to the display module 13.

In further detail, a nut 30 is inserted into the front edge of the front panel 11, and a fastening member is passed through the bracket 15 and the module lug 131 and inserted into the nut 30. To prevent damage to the front panel 11 by the nut 30, a rubber bushing 31 may be inserted over the outer circumference of the nut 30. The boss 151 formed at the center of the bracket 15 extends further to the opposite side, and the extended portion is inserted into a portion of the nut 30. The fastening member passes through the module lug 131 and the boss 151 in sequence, and inserts into the nut 30. Through this coupling structure, disengaging of the front panel 11 from the frame 12 due to weight can be avoided.

The rear housing 14 is coupled to the frame 12, and the way of coupling the rear housing 14 and the frame 12 may be the same as the way described in FIG. 1 to FIG. 8, using the fixing projections 122b and fastening holes 122a.

Figure 12:
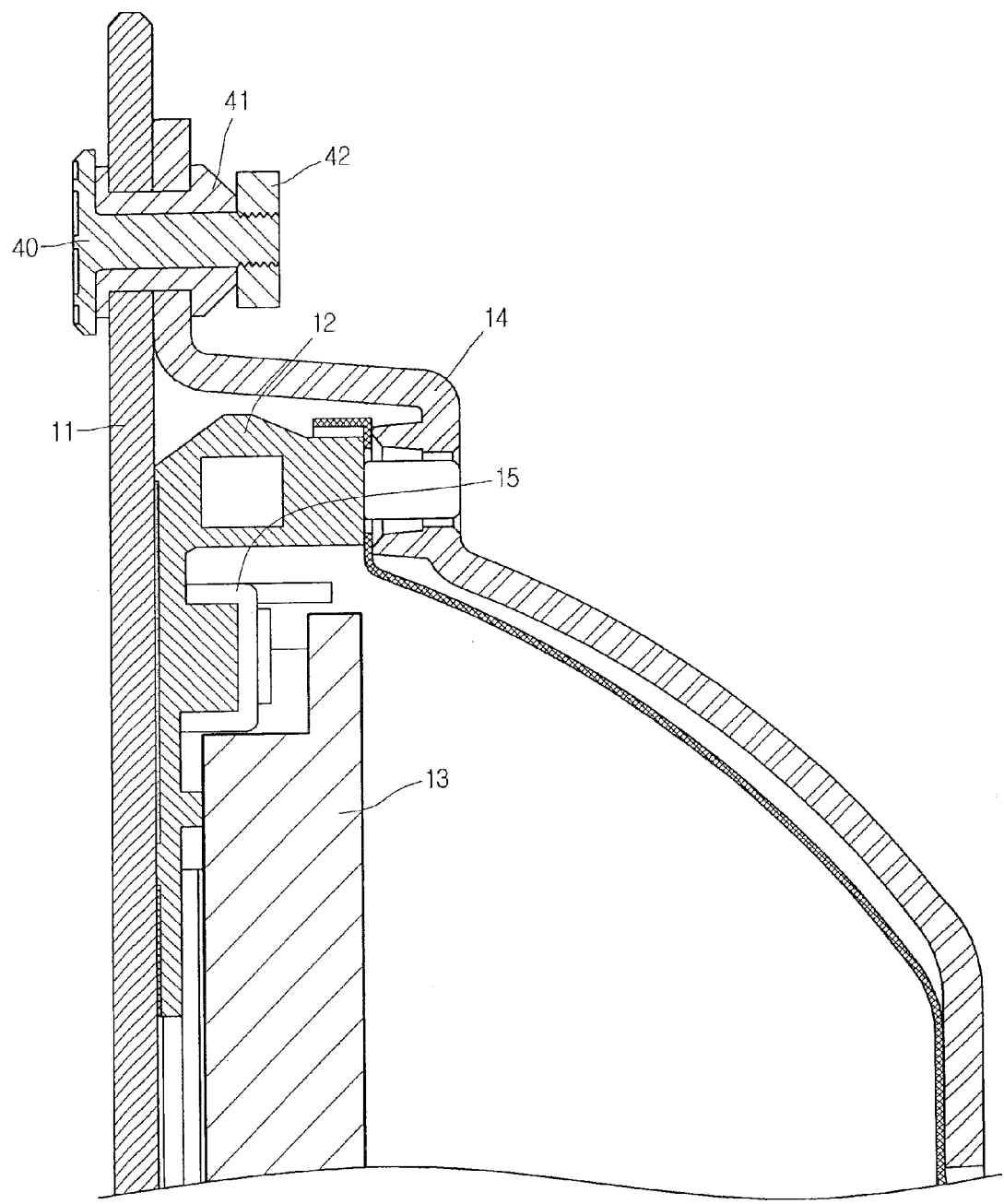
FIG. 12 is a side sectional view showing the coupling structure of a rear housing according to an embodiment of the present disclosure.

FIG. 12 is a side sectional view showing the coupling structure of a rear housing according to another embodiment of the present disclosure.

Referring to FIG. 12, the present embodiment is characterized by the rear housing 14 being coupled directly to the front panel 11.

In detail, the front edge of the rear housing 14 may be formed in a size that is the same as or smaller than the front panel 11, so that the front edges of the rear housing 14 cannot be seen from the front of the display apparatus 10.

The front edge of the rear housing 14 is bent in parallel directions with the front panel 11 to form the coupling surfaces. A screw 40 or other fastening member is inserted from the front of the front panel 11 through the rear housing 14. A nut 42 is inserted over the outer circumference of the screw 40 that passes and protrudes through the rear housing. Of course, an anti-wear bushing 41 is inserted between the screw 40 and the front panel 11.

As depicted in FIG. 11, a structure in which the screw is inserted in the front of the front panel 11 may be employed.

Figure 13:
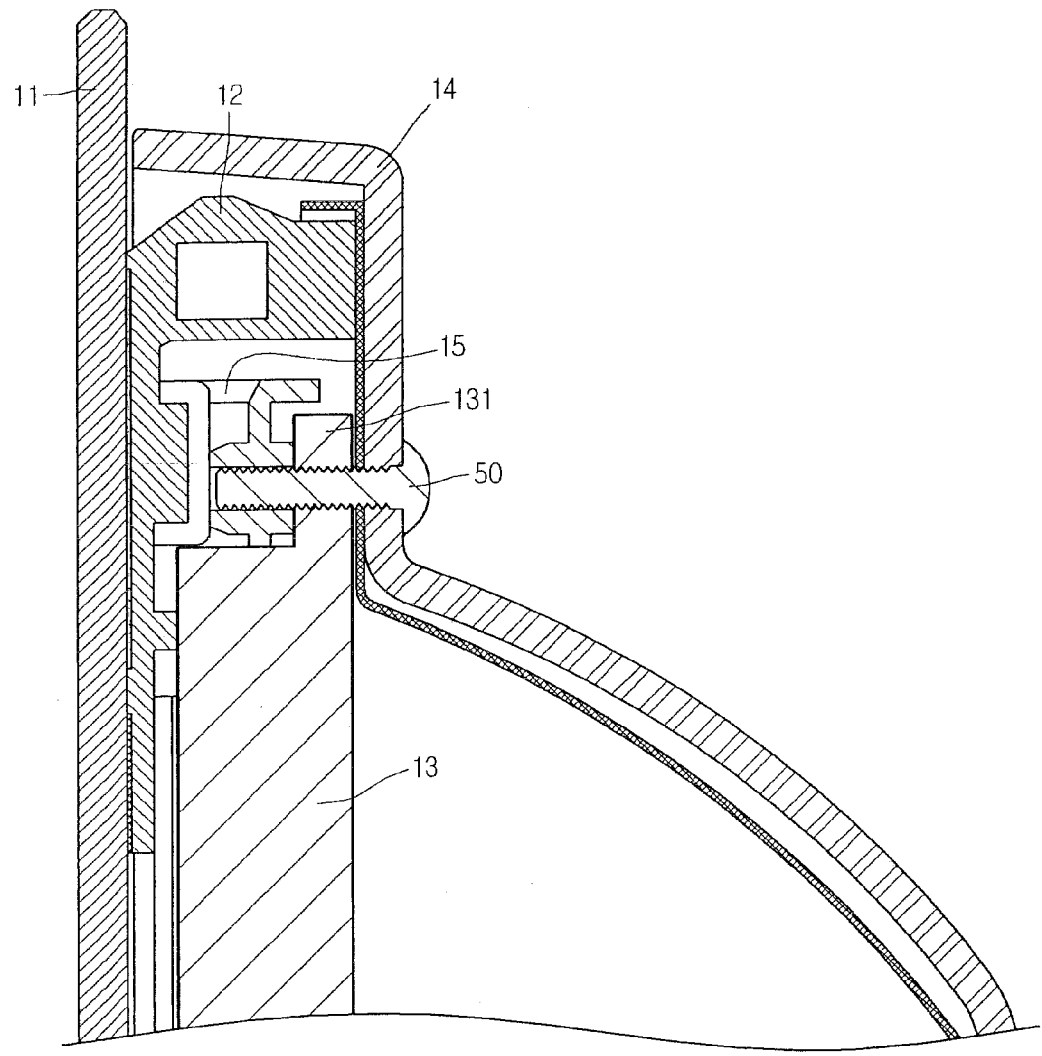
FIG. 13 is a side sectional view showing the coupling structure of a rear housing according to another embodiment of the present disclosure.

FIG. 13 is a side sectional view showing the coupling structure of a rear housing according to another embodiment of the present disclosure.

Referring to FIG. 13, the rear housing 14 is fixed to the display module 13.

That is, the screw 50 may be sequentially passed through the rear housing 14 and the module lug 131, and inserted into the boss 151 of the bracket 15.

Here, to prevent the screw 50 from loosening, a screw thread is formed on the inner circumference of the boss 151.

In another method, as shown in FIG. 11, the fastening member passing through the rear housing 14 is passed through the module lug 131 and the boss 151, inserted in the front surface of the front panel 11, and ultimately inserted into the nut 30.

In this configuration, the front panel 11, frame 12, display module 13, and rear housing 14 may be integrally coupled through a single screw 32 and nut 30.

Figure 14:
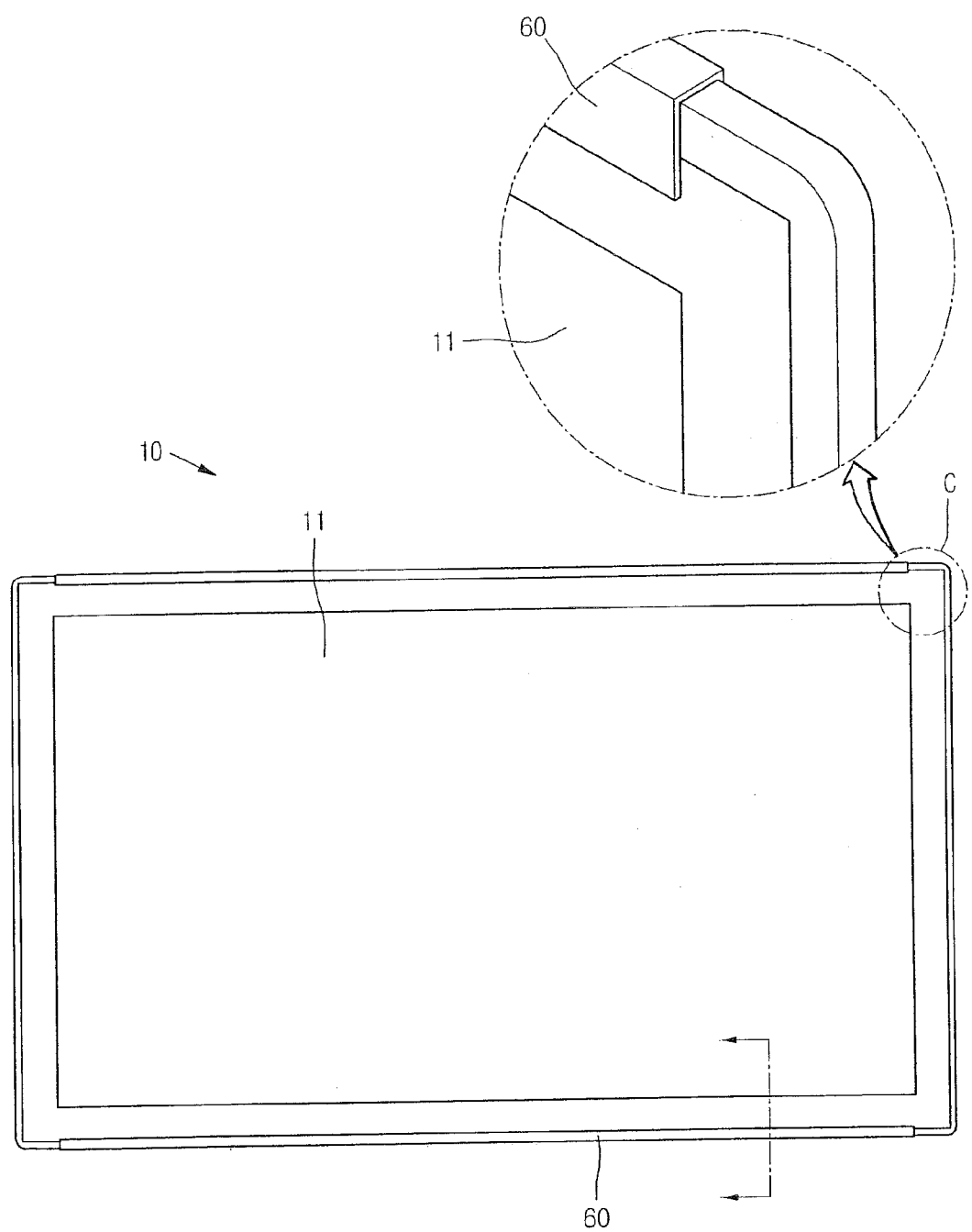
FIG. 14 is an enlarged perspective view showing a front panel supporting structure of a display apparatus depicted in a frontal view according to an embodiment of the present disclosure.
Figure 15:
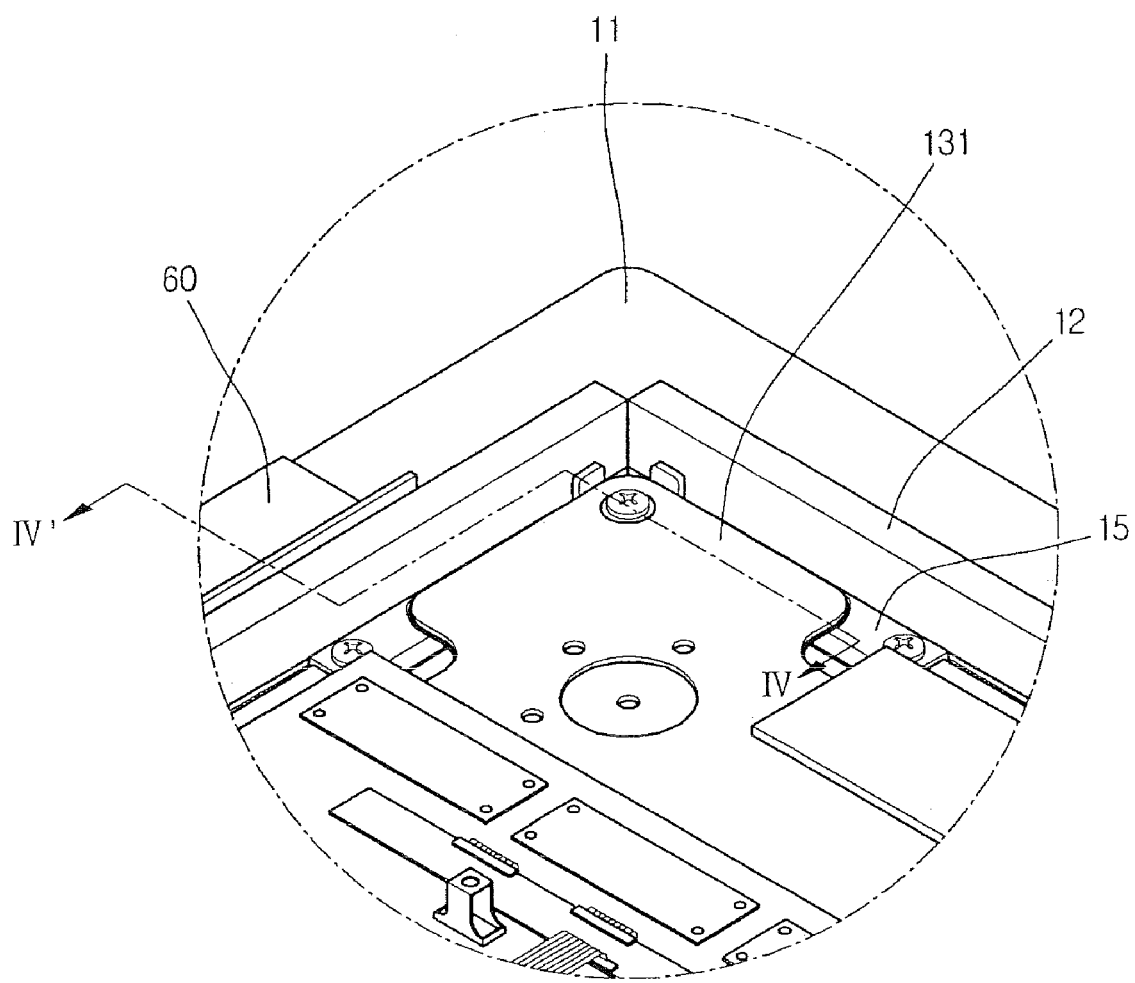
FIG. 15 is a partial rear perspective view of region C in FIG. 14.
Figure 16:
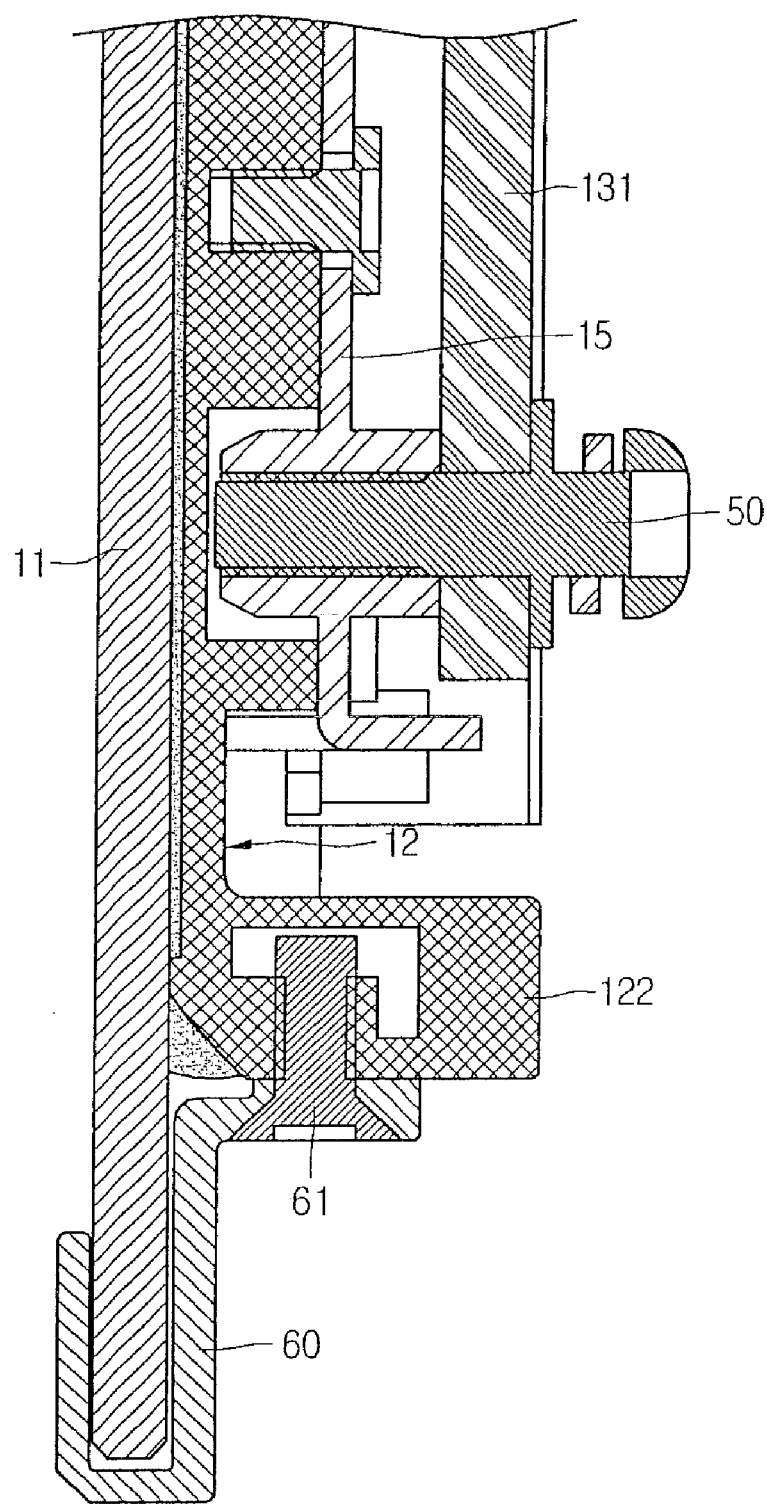
FIG. 16 is a sectional view of FIG. 15 taken along line IV-IV'.

FIG. 14 is an enlarged perspective view showing a front panel supporting structure of a display apparatus depicted in a frontal view according to an embodiment of the present disclosure, FIG. 15 is a partial rear perspective view of region C in FIG. 14, and FIG. 16 is a sectional view of FIG. 15 taken along line IV-IV'.

Referring to FIGS. 14 to 16, to prevent the front panel 11 of a display apparatus 10 according to the present disclosure from separating from the frame 12 due to excessive weight, a separate supporting structure may be provided.

That is, a supporter 60 (as shown in FIGS. 14 to 16) may be coupled at the upper surface and lower surface of the front panel 11.

In further detail, the supporter 60 may be formed in a length that entirely or partially covers the top and bottom edges of the front panel 11. The supporter 60 is bent a plurality of times in order to securely support the front panel 11, to cover portions of the rear, bottom, and front surfaces of the front panel 11. Of course, the supporter 60 mounted at the top end of the front panel 11 provides a structure that covers portions of the rear, top, and front surfaces of the front panel 11.

The supporter 60 is coupled to the head 122 of the frame. That is, a fastening hole is defined in the head 122, and a fastening hole is also formed at an end of the supporter 60. A screw or other fastening member is passed through the supporter 60 and inserted into the head 122.

In the above configuration, the upper edge of the front panel 11 is securely supported, preventing the front panel 11 from disengaging from the frame 12 and leaning forward.

The bottom edge of the front panel 11 is also securely supported, so that the front panel 11 is prevented from falling due to excessive weight.

Here, the supporter 60 may be provided only at the lower end of the front panel 11.

Figure 17:
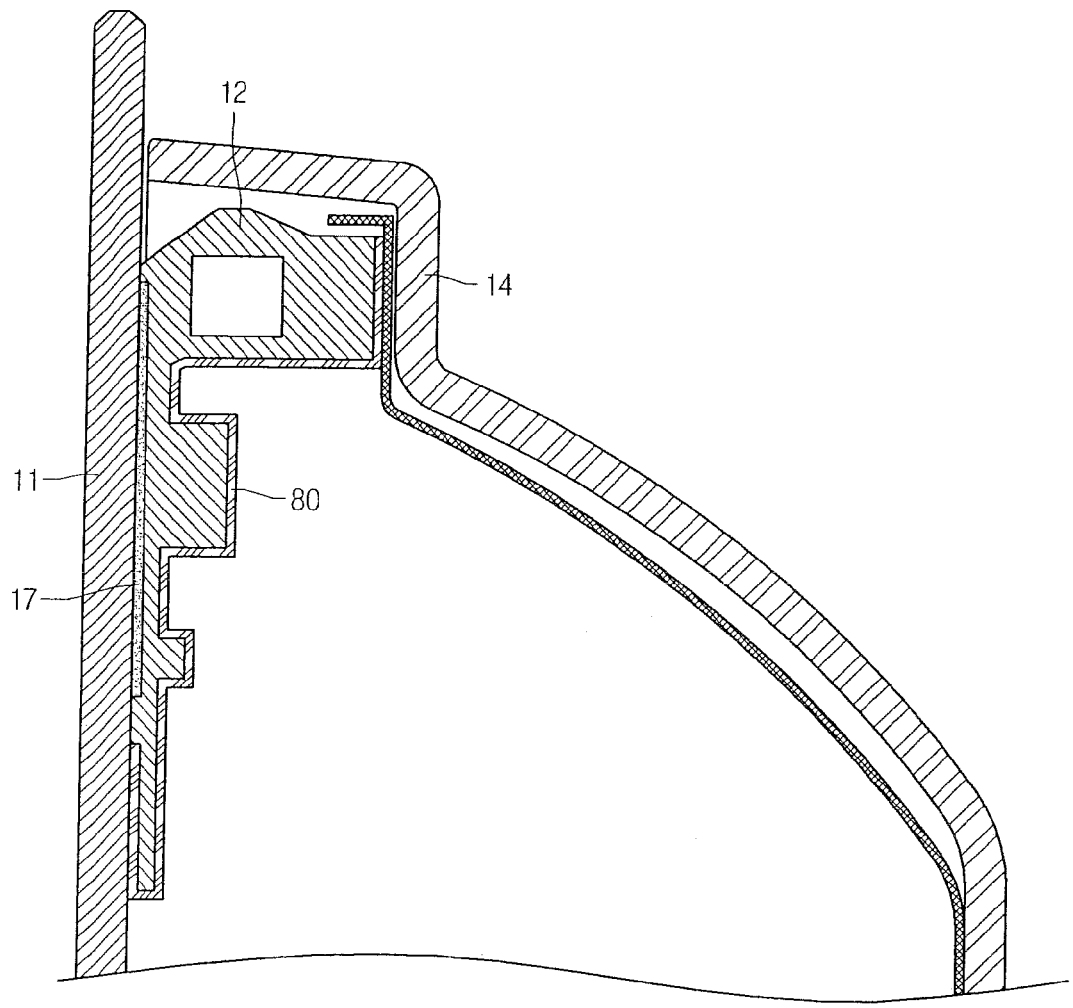
FIG. 17 is a sectional view showing an electromagnetic interference (EMI) grounding structure according to an embodiment of the present disclosure.

FIG. 17 is a sectional view showing an EMI grounding structure according to an embodiment of the present disclosure.

Referring to FIG. 17, the present embodiment provides a grounding structure for blocking EMI when a frame 12 made of a non-conductive material is used.

Specifically, when the frame 12 is made of a plastic injection molded material or the like, a structure is needed to absorb EMI. Thus, in order to ground EMI that is emitted at the rear housing 14, a separate grounding member 80 is attached to the frame 12.

In further detail, one end of the grounding member 80 is inserted in the gasket mounting surface 126 of the frame 12. The grounding member 80 is extended along the surface of the frame 12 and connected at the other end to the rear housing 14. Thus, the rear housing 14 made of a conductive material acts as a ground to block EMI.

Here, the grounding member 80 may cover the entire rear surface of the frame 12 or a portion thereof. However, it is sufficient to electrically connect the front panel 11 and the rear housing 14 through the grounding member 80. For example, even if the grounding member 80 is only disposed between the perimeter and the center of the frame 12, EMI is sufficiently blocked.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus, comprising:
   a front panel that defines a front portion of the display apparatus;
   a frame adjacent to the front panel;
   a display module adjacent to the frame, and configured to output an image, wherein the display module has a high definition resolution;
   means for switching channels of the display module;
   a rear housing provided behind the display module;
   a blocking member disposed on a prescribed area on a rear of the front panel, wherein substantially all of the blocking member provided on the prescribed area is visible from a front of the front panel; and
   a supporter covering at least one edge of the front panel.

2. The display apparatus of claim 1, wherein the supporter covers a side of the at least one edge of the front panel.

3. The display apparatus of claim 1, wherein a gap is provided between the edge of the front panel and an inside edge of the supporter at an area corresponding to the at least one edge of the front panel.

4. The display apparatus of claim 1, wherein the frame includes a body and a head that protrudes from the body.

5. The display apparatus of claim 4, wherein the rear housing has a hole, and the head of the frame is provided in the hole.

6. The display apparatus of claim 1, wherein an outer edge of the blocking member is mis-aligned with an outer edge of the front panel.

7. The display apparatus of claim 1, wherein dimensions of the blocking member are larger than dimensions of the frame such that the blocking member blocks the frame from being viewed from outside of the display apparatus.

8. The display apparatus of claim 1, further comprising an impurity blocking member at an upper area between the front panel and the frame.

9. The display apparatus of claim 1, wherein a hole is provided on the frame to attach with the rear housing.

10. The display apparatus of claim 1, wherein the frame comprises a plurality of frames.

11. The display apparatus of claim 10, wherein two of the frames are attached by a bracket at an end of each of the two frames.

12. The display apparatus of claim 1, further comprising a stand to support the display apparatus.

13. The display apparatus of claim 1, wherein the means for switching channels includes means for controlling volume or turning power on and off.

14. The display apparatus of claim 13, wherein the means is provided at a bottom of the display apparatus.

15. The display apparatus of claim 14, wherein the means includes a touch panel provided at a front of the display apparatus.

16. The display apparatus of claim 1, wherein the front panel is a flat front panel having a uniform thickness.

17. The display apparatus of claim 1, wherein the front panel, the frame and the display module are provided such that a portion of the frame is provided between the front panel and the display module.

18. The display apparatus of claim 1, wherein the blocking member is an opaque film.

19. The display apparatus of claim 1, wherein the frame is attached to a rear surface of the front panel by an adhering member, wherein the adhering member includes one of a double-sided tape or an adhesive.

20. The display apparatus of claim 1, wherein at least one edge portion of the front panel is configured to be externally exposed.

21. The display apparatus of claim 20, wherein the at least one edge portion includes four edge portions of the front panel.

22. The display apparatus of claim 20, wherein the at least one edge portion includes a peripheral front surface of the front panel.

23. The display apparatus of claim 1, wherein the rear housing covers the entire display module.

24. The display apparatus of claim 1, wherein the rear housing is disposed on the rear surface of the front panel.

25. The display apparatus of claim 24, wherein the rear housing covers the frame such that the frame is not exposed to outside of the rear housing.

26. The display apparatus of claim 24, wherein the rear housing is disposed on the rear surface of the front panel with a predetermined gap apart from the outer edge of the front panel.

27. The display apparatus of claim 1, wherein a corner of the front panel is round.

28. A display apparatus, comprising:
a front panel to define a front portion of the display apparatus;
a plurality of frames adjacent to the front panel;
a high definition resolution display module adjacent to the frames, and configured to output a high definition resolution an image;
means for switching channels of the display module;
a rear housing provided behind the display module;
a blocking member on a prescribed area on a rear of the front panel, wherein substantially all of the blocking member provided on the prescribed area is visible from a front of the front panel; and
a supporter that covers a side of at least one edge of the front panel.

* * * * *